Sept. 22, 1953

T. B. KEESLING 2,652,872

PEACH PITTER

Filed June 25, 1949

INVENTOR.
THOMAS B. KEESLING
BY
Harper Allen
ATTORNEY

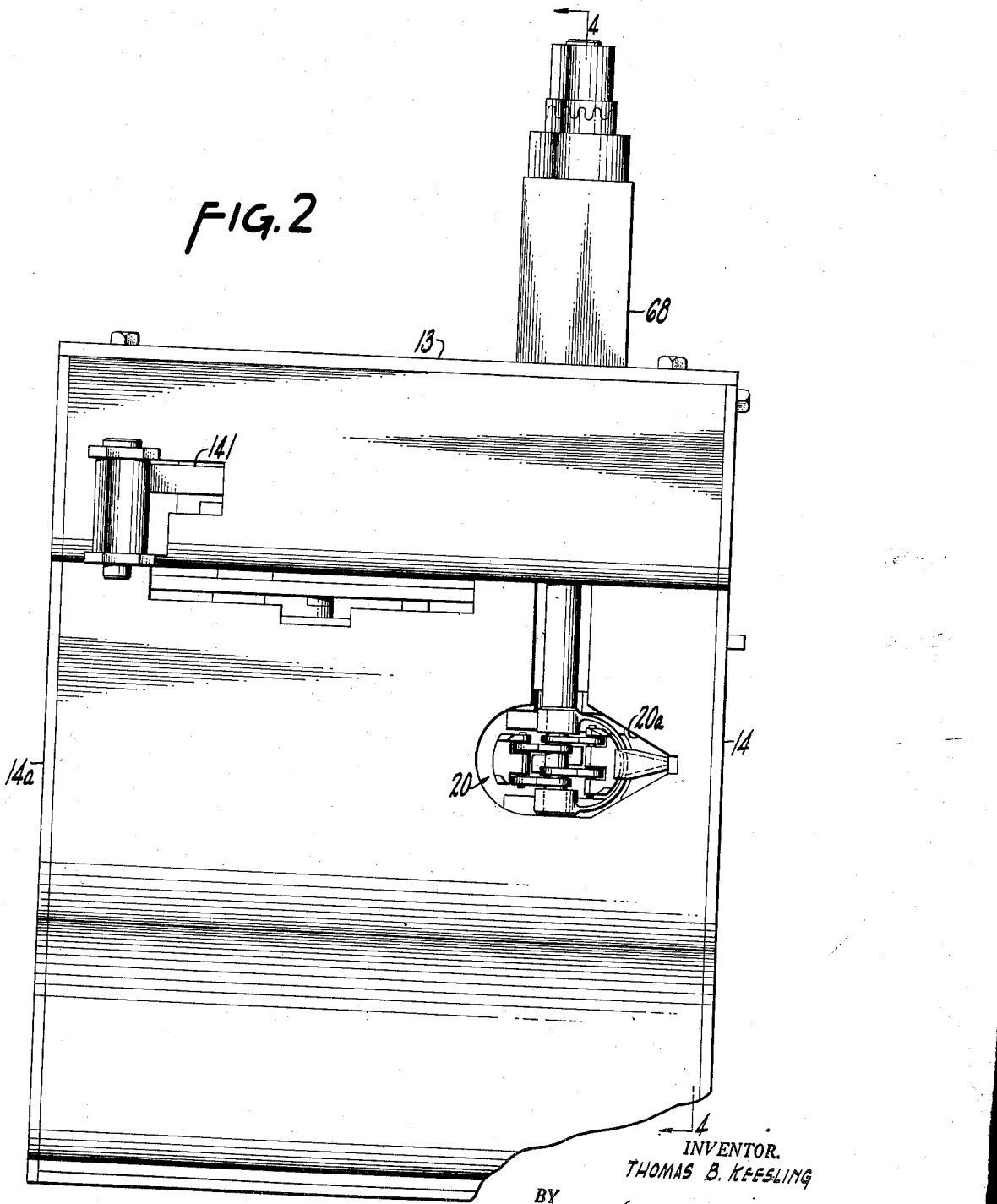

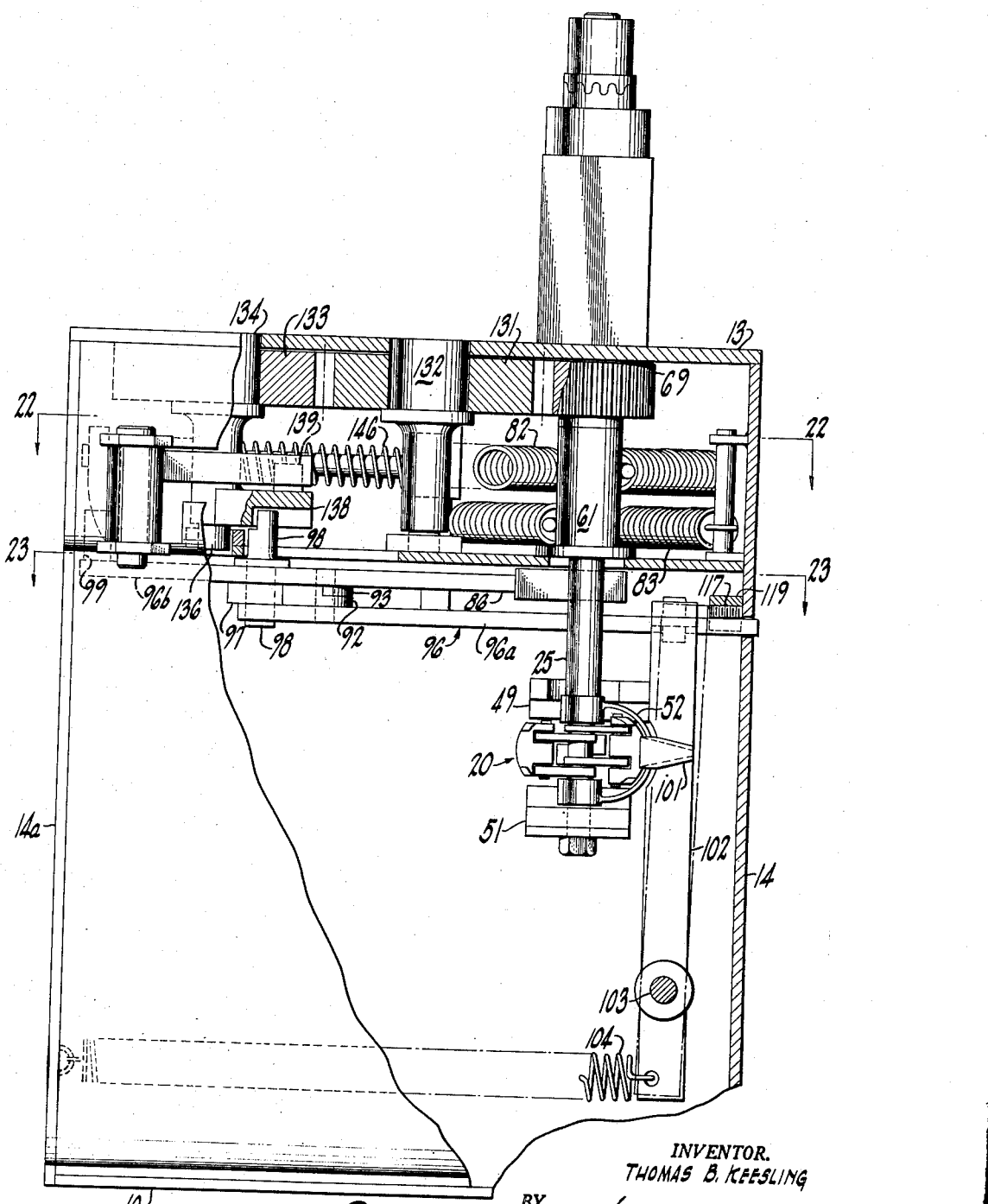

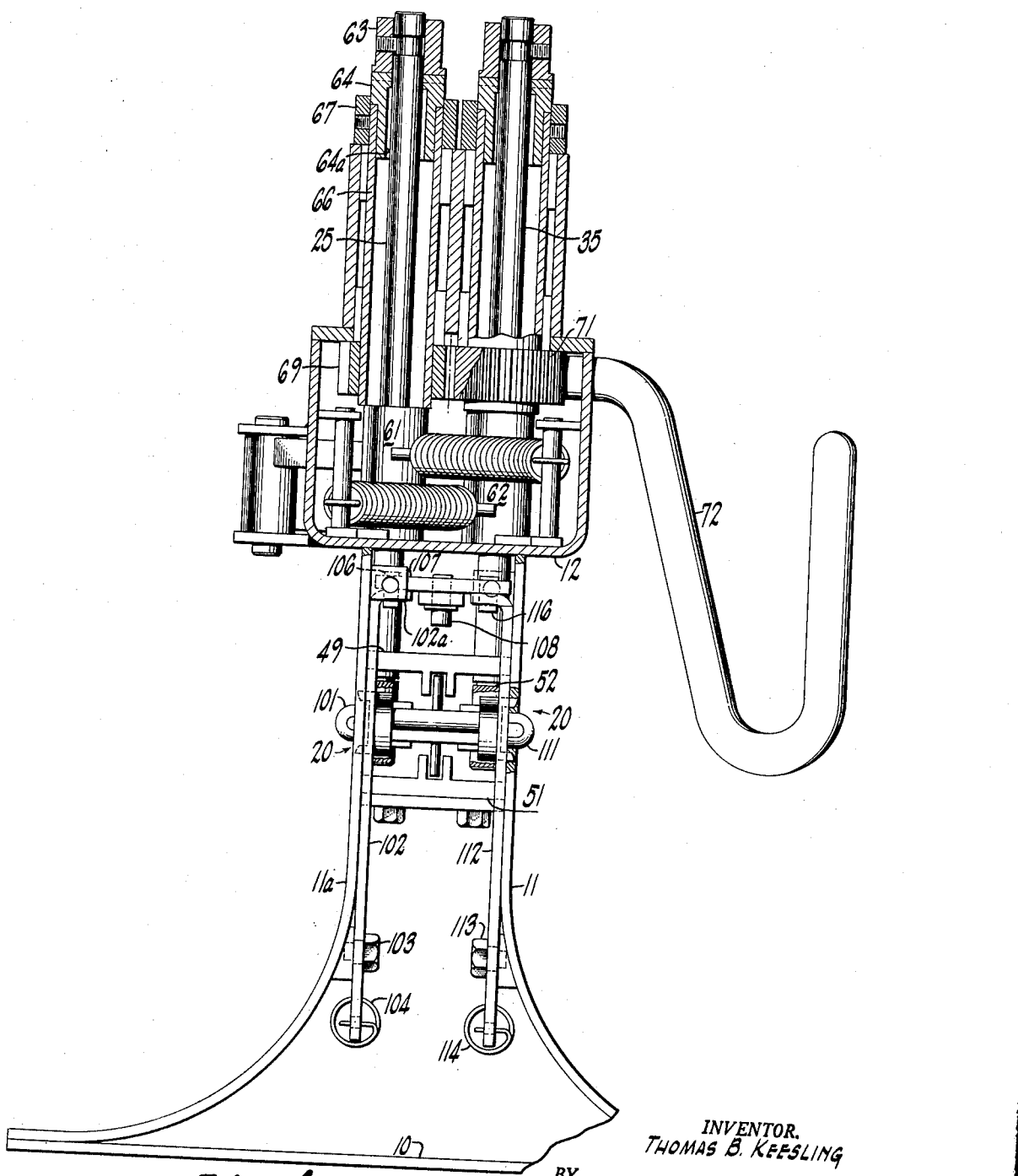

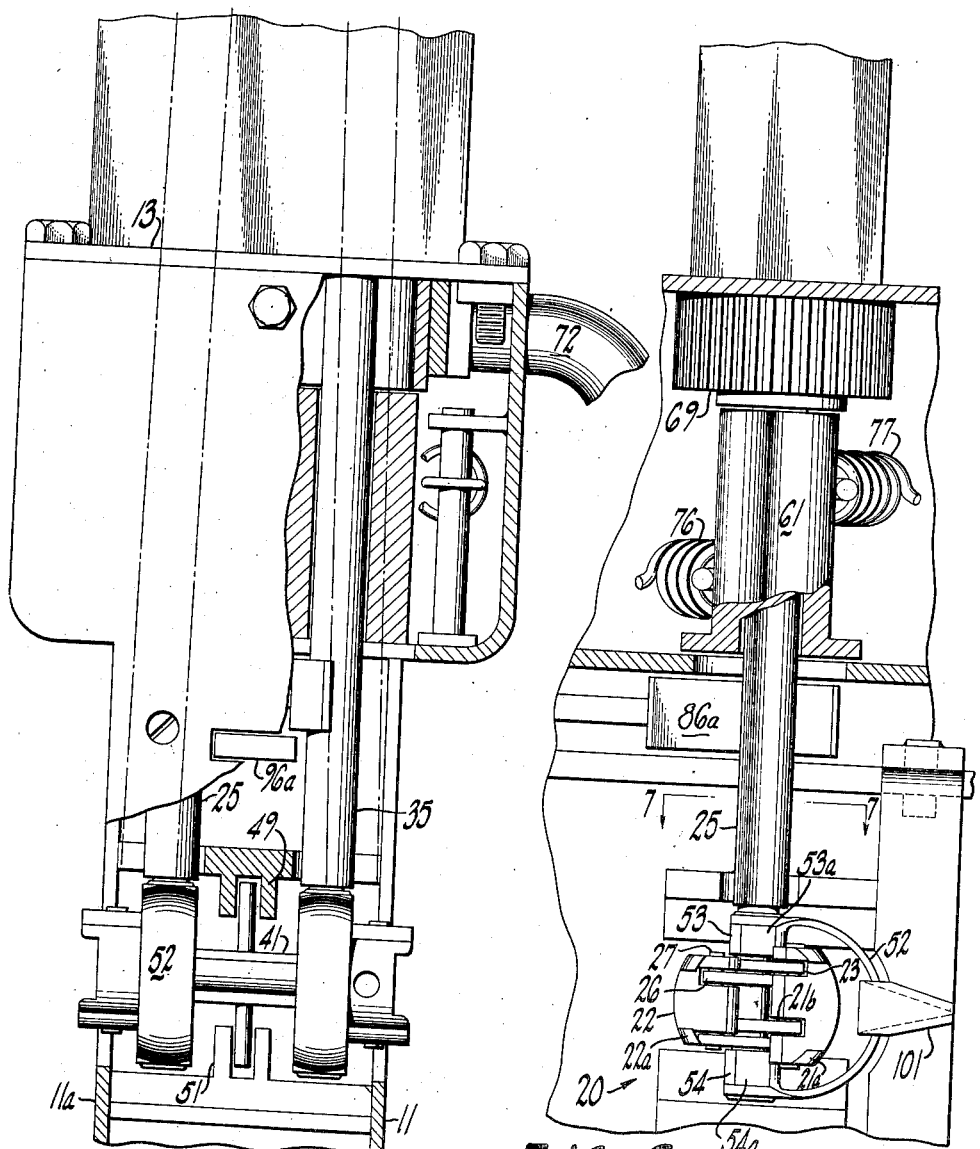

Sept. 22, 1953     T. B. KEESLING     2,652,872
PEACH PITTER

Filed June 25, 1949     10 Sheets-Sheet 6

INVENTOR.
THOMAS B. KEESLING
BY
Harper Allen
ATTORNEY

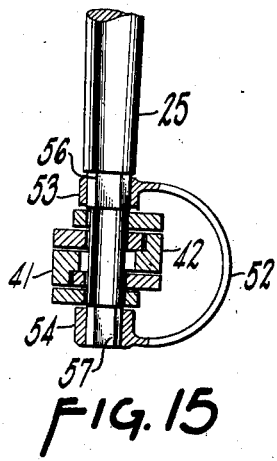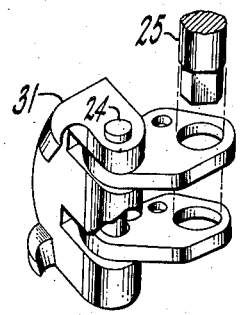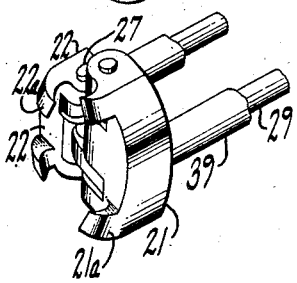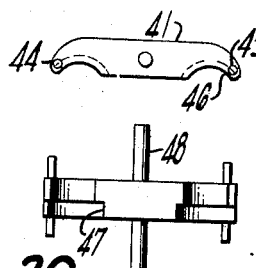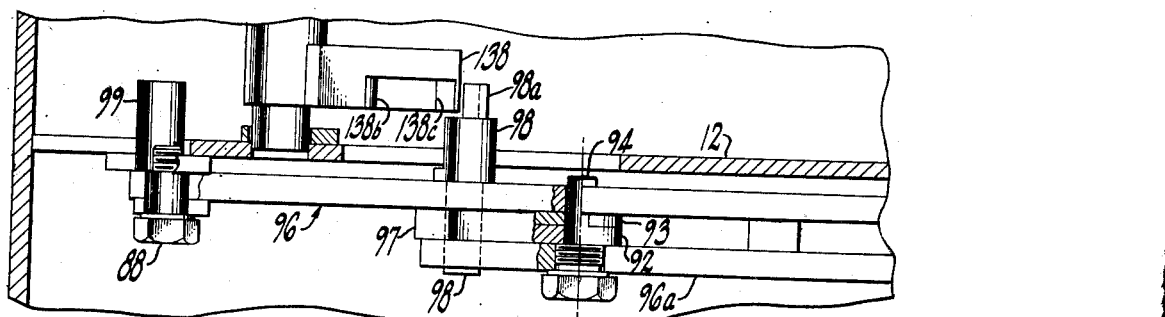

Sept. 22, 1953

T. B. KEESLING 2,652,872

PEACH PITTER

Filed June 25, 1949

INVENTOR.
THOMAS B. KEESLING
BY
Harper Allen
ATTORNEY

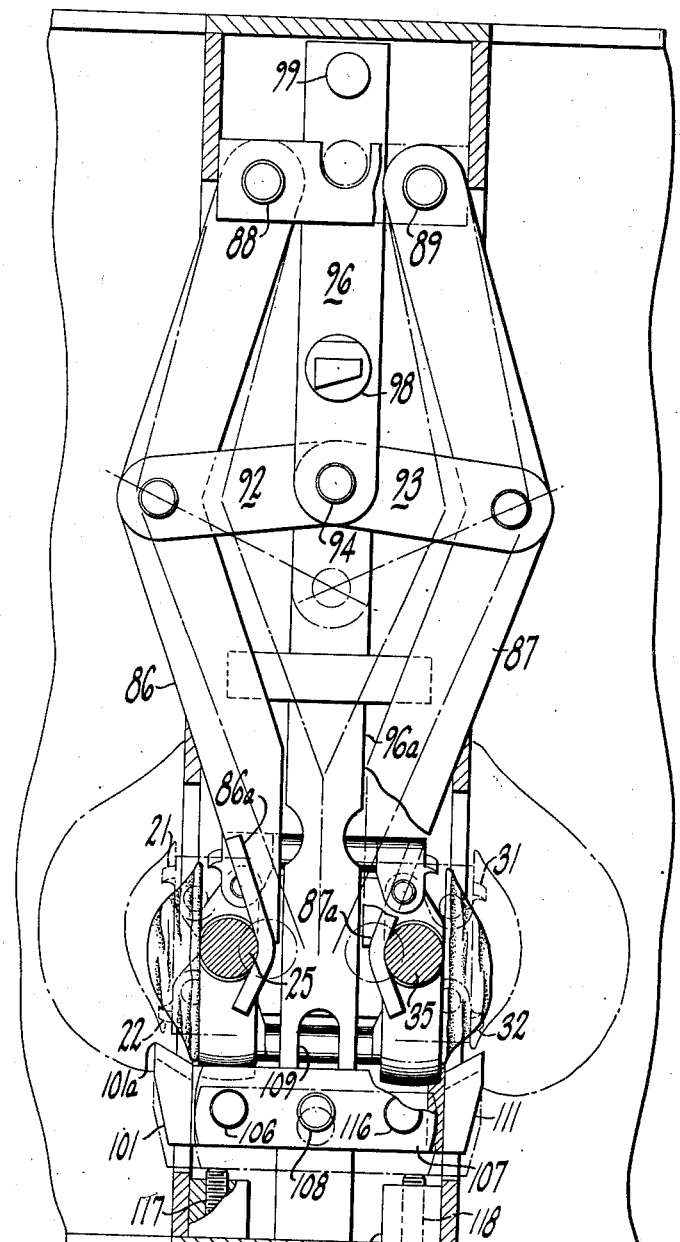

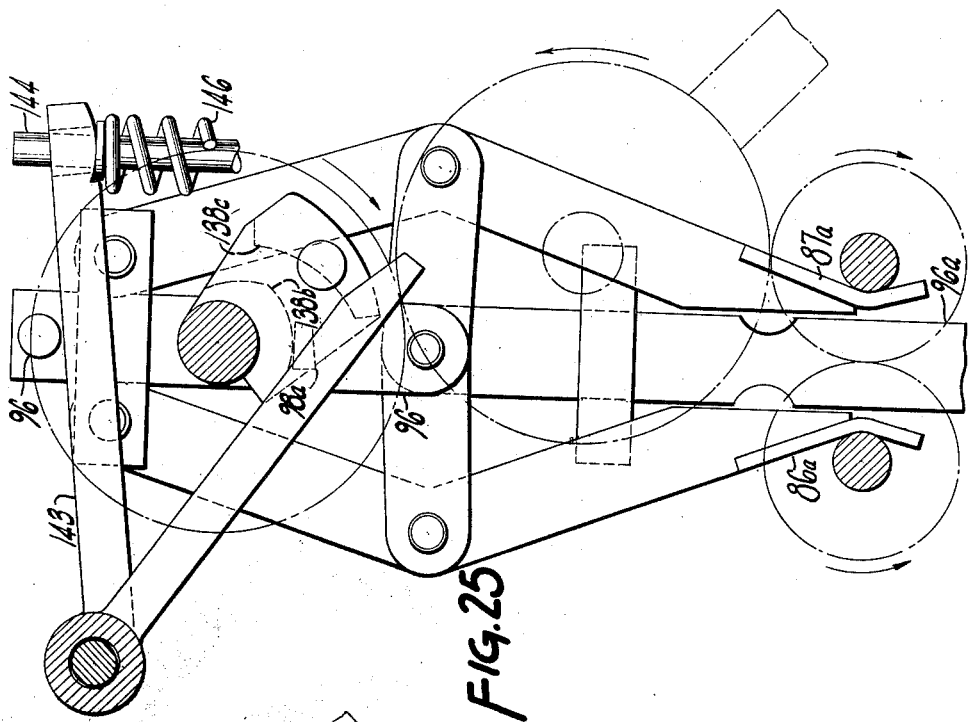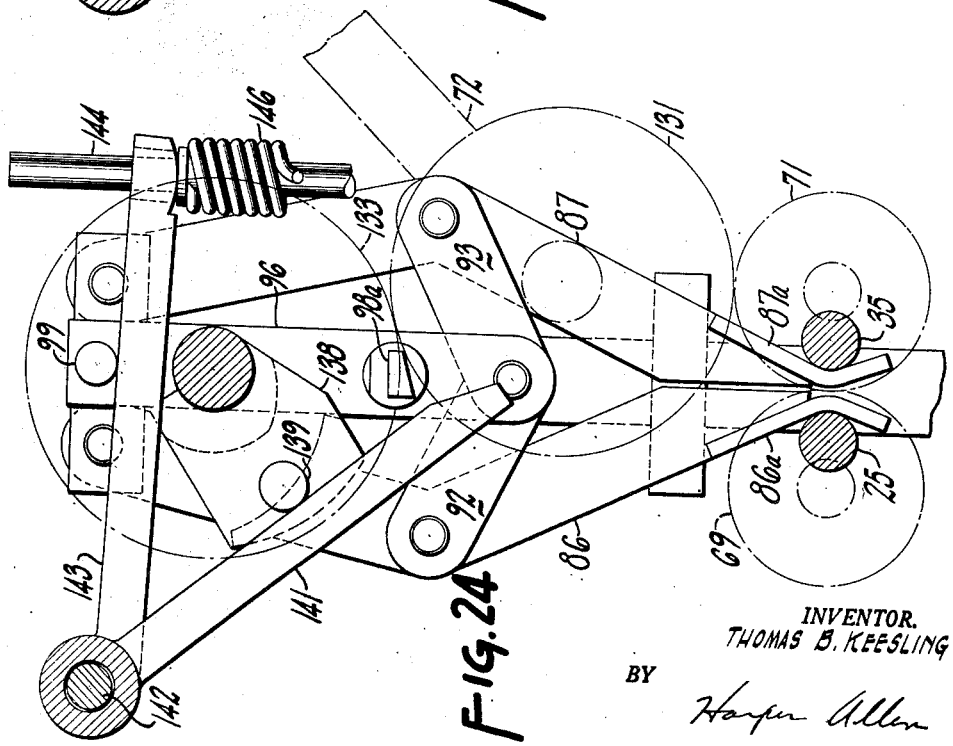

Patented Sept. 22, 1953

2,652,872

UNITED STATES PATENT OFFICE 2,652,872

PEACH PITTER

Thomas B. Keesling, Los Gatos, Calif.

Application June 25, 1949, Serial No. 101,297

28 Claims. (Cl. 146—28)

1

The present invention relates to peach pitters and is concerned more particularly with an improved pitter in which the peach is held for the pitting operation by gripping the pit.

The invention has for its objects, among others, the provision of a pitting structure which will enable the pitting of field run peaches without special sizing operations; which supports the peach by its pit during the pitting operation and thereby avoids damage to or bruising of the flesh of the peach; which avoids the necessity for having a substantially enclosed pitting structure which is difficult of access as found in conventional pitters which hold the peach halves from their outer surfaces; which always removes substantially the same thickness of flesh with the peach pit; and which removes many design limitations in pitting structures by virtue of the accessibility of the pitting structure for feed purposes.

The above and other objects and advantages of the invention will be apparent from the following description of a preferred embodiment thereof, as illustrated in the accompanying drawings, in which:

Figure 2 is a side elevational view of the peach pitter.

Figure 3 is a view similar to Figure 2 but with certain parts broken away and shown in section to show details of construction.

Figure 4 is a transverse sectional view taken as indicated by the line 4—4 in Figure 2.

Figure 5 is an enlarged elevational view looking from the end of the machine with certain parts broken away and shown in section to illustrate details of construction. The pitting heads are shown in closed portion.

Figure 6 is an enlarged elevational view of one of the pitting heads with certain parts shown in section.

Figure 15 is a sectional view through one of the pitting heads taken as indicated by the line 15—15 in Figure 7.

Figure 16 is a perspective view of one jaw of a pitting head.

Figure 17 is perspective view of the cooperating jaws of a pitting head.

2

Figure 18 is a plan view of one of the reaction connecting links.

Figure 19 is an elevational view of the links shown in Figure 18.

Figure 20 is a bottom plan view of the control cam.

Figure 21 is an enlarged view, partially in section, illustrating details of construction of the control slide with the slide shown in tripped position.

Figure 22:
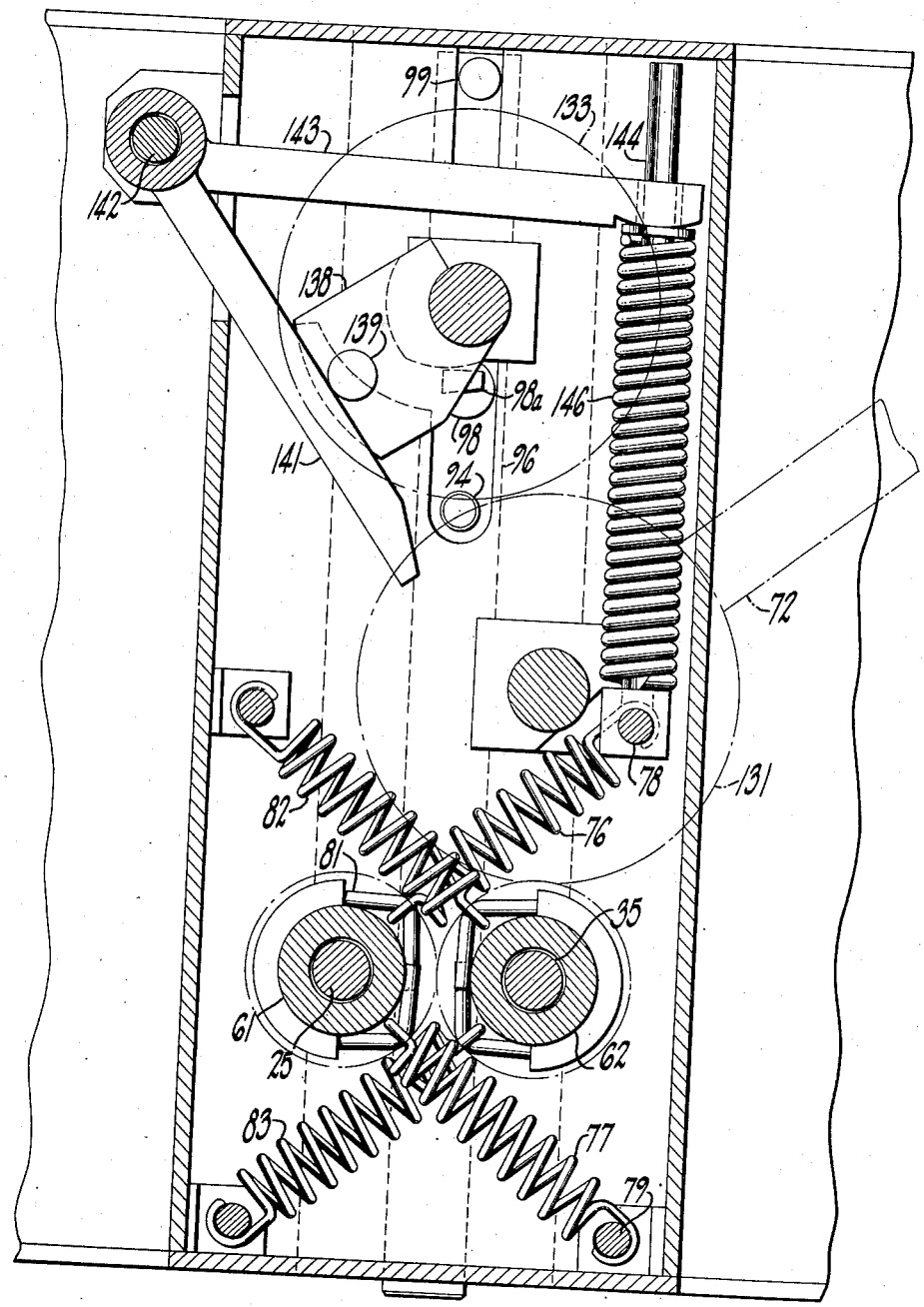

Figure 22 is a horizontal sectional view taken as indicated by the line 22—22 in Figure 3.

Figure 23 is a horizontal sectional view taken as indicated by the line 23—23 in Figure 3.

Figure 24 is a view similar to Figure 23 but showing the parts in a different operating position.

Figure 25 is also similar to Figures 23 and 24 but showing another operating condition of the parts.

Referring to Figures 1 through 4, the peach pitter includes a frame structure for supporting the various operating parts including a base plate 10 from the respective sides of which concavely curved side walls 11 extend upwardly with their upper straight vertically disposed portions connected as by welding to the bottom wall of a U-shaped frame or housing member 12. The housing member 12 has secured thereon a top plate 13. Respective end walls 14 and 14a are detachably secured to the frame structure by a plurality of cap screws 16 engaging suitable threaded frame blocks 17 welded to the frame structure.

The respective side walls 11 and the lower chamber of the frame serve to house similar oppositely disposed pitting heads 20 respectively, which are exposed through similar apertures 20a in the respective side walls 11. The space within the upper frame member 12 serves to house suitable control and drive structure required in connection with the pitting heads 20, as referred to in greater detail hereinafter.

As explained generally above, the pitting heads 20 are provided with gripping elements or jaws comprising respective spaced fingers which are adapted to grasp the half of a pit within a split peach half so that the peach halves engaged therewith are supported entirely by virtue of the pit. Preferably, these pitting heads are provided with a floating mounting, that is, they are capable of limited universal movement in engaging a peach pit, so that the position of the peach with reference to the pitting head need not be adjusted too accurately. This floating movement is also employed in the actual closing of the gripping jaws to grasp the peach pit when the heads are tripped for the peach securing operation preliminary to the actual pitting or cutting away of the flesh of the peach from the peach pit.

Referring to Figures 4, 5, 6, 7 and 15 through 19, the structure of the respective pitting heads and their connection to each other will be described in detail. Referring particularly to Figures 4, 5, and 6, the left-hand pitting head 20 as seen in Figure 4, which is seen in elevation in Figure 6, comprises a pair of opposed jaws 21 and 22 having respective spaced apart tapered gripping fingers 21a and 22a, respectively. The jaw 21 has its fingers 21a spaced farther apart than the fingers 22a of the jaw 22 and is adapted to be related to the stem end of the pit while the jaw 22 is for cooperation with the narrower blossom end of the pit.

Figure 7:
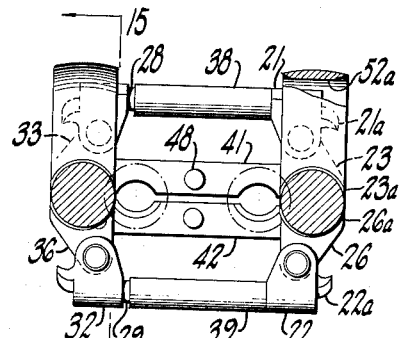
Figure 7 is a horizontal sectional view taken as indicated by the line 7—7 in Figure 6.

The jaws 21 and 22 are connected by a toggle linkage controlling their open and closed positions and also cooperating with the jaws in providing for proper positioning of a peach half with reference to the jaws. A pair of parallel toggle links 23 are pivotally connected to the jaw 21 by a pin 24. These links 23 extend into respective recessed slots 21b of the jaw 21. At their opposite ends the links 23 are pivotally connected to a support shaft 25 referred to in greater detail hereinafter. Respective parallel links 26 forming the other part of the toggle linkage are also pivotally connected to the shaft 25 at one end and to the jaw 22 at the other by a pin 27. As seen in Figure 7, the respective links 23 and 26 have respective flat surfaces 23a and 26a which in the retracted or home position of the jaws 21 and 22, as seen at the left of Figure 7, lie in the same plane to form a generally flat pit-engaging surface during position of the pit and peach half with respect thereto, as referred to in greater detail hereinafter.

The opposite pitting head 20, i. e., the one to the left in Figure 7, is likewise composed of a large jaw 31, a small jaw 32, the large jaw being connected by toggle links 33 to the support and control shaft 35, and the small jaw being connected by toggle links 36 to this shaft 35. As will be explained later in greater detail, the respective support and control shafts 25 and 35 have a floating mounting and are thrust outwardly to open the respective jaws and inwardly with respect to each other to close these jaws. To provide points of reaction for these respective linkages the respective pitting heads 20 are interconnected by a pair of links 41 and 42 (Figure 7). The link 41 has one end positioned between the toggle arms 23 of the head 21 and its pivotally connected thereto by a pin 43, while its other end is interposed between the parallel links 33 and is pivotally connected thereto by a pin 44. It will be noted that the pivotal connections 43 and 44 of the respective toggle arms 23 and 33 are disposed intermediate the pivotal connection to the shafts 25 and 35, respectively, and the jaws 21 and 31, respectively. Similarly, the connecting link 42 is connected between the other set of toggle arms 26 and 36, respectively, with a similar intermediate positioning of these pivots 43 and 44 with respect to the toggle arms.

To further control and guide the movement of the jaws 21, 22 and 31 and 32 of the respective heads 20 and to thereby insure parallel positioning of these jaws in their respective adjusted positions, the jaws 21 and 22 (Figure 7) have extending at right angles to the plane surfaces thereof intermediate their gripping fingers 21a and 22a, respectively, integrally formed pins 28 and 29 telescopically engaged with similarly integral tubular extensions 38 and 39 of the jaws 31 and 32 of the other head 20.

Referring to Figures 7, 18 and 19, it will be seen that the inner or adjacent surfaces of the connecting reaction link 41 have suitable annular recesses 46 therein for clearance purposes with respect to the shafts 25 and 35 and adjacent each of these recesses there is an annular ledge 47 for clearance purposes with respect to the cooperating link 23 or 33, as the case may be. Link 42 is similarly constructed.

In controlling the pivoting movement of the toggle linkages in the respective pitting heads, the reaction links 41 and 42 while floatingly mounted are restrained against endwise floating, i. e., in the crosswise direction between the two heads, but are permitted a lateral floating movement in a direction at right angles thereto. For this purpose the reactions links 41 and 42 (Figures 4 and 19) are provided with respective pins 48 extending vertically therethrough for cooperation with respective grooved guides 49 and 51 disposed immediately above and below the pitting head structure and suitably secured between the side walls 11. The lower guide 51 is preferably removably mounted to enable installation of the pitting heads in place on the shafts 25 and 35.

Each of the pitting heads has associated therewith a pitting knife of semi-circular form, the respective knives being similar in construction but being so connected to their hubs that they are in right-hand and left-hand positions as finally assembled in the machine. The knife 52 (Figures 6, 7, and 15) has respective hubs 53 and 54 secured thereto and these hubs are provided with respective hexagonal sockets of differing size with the smaller socket in the hub 54 for driving engagement with hexagonal sections 56 and 57 of the drive shaft 25. It will be noted that these hubs 53 and 54 (Figure 6) have respective flat surfaces 53a and 54a lying in a plane containing the cutting edge of the knife and also lying in the plane of the pit positioning surfaces 23a and 26a of the links 23 and 26 in the home position of the pitting head as seen in Figure 7. As seen in Figure 7, the knife 52 has a bevel 52a on its inner periphery to form the cutting edge and this bevel 52a also serves in a manner later described in certain pitting operations to aid in the success thereof.

Referring to Figures 3 through 6, the respective shafts 25 and 35 extend upwardly through suitable apertures in the bottom wall of the frame member 12 and through respective floating guide sleeves 61 and 62 slidably supported on the frame member 12. At their upper ends the shafts 25 and 35 carry respective collars 63 of a flexible drive connection therefor. The respective collars 63 are provided at their lower ends with teeth of crown gear type meshing with similar teeth at the upper end of a drive coupling 64, which is internally recessed at 64a in each case to provide clearance for the floating movement of the associated shaft 25 or 35. The drive coupling 64 is seated on a drive sleeve 66 secured thereto by a collar 67 and an associated set screw, and the collar 67 is supported on a tubular housing member 68 mounted on the top of the frame. At the lower ends of the respective drive sleeves 66 there are provided gears 69 and 71, respectively, which mesh with each other, and are driven in a manner later described from a drive handle 72. The geared connection between the collars 63 and the drive couplings 64 is of a conventional form and transmits a drive while providing a limited amount of relative universal tilting movement, as a result of the shafts 25 and 35 are mounted at their upper ends in connection with the drive therefor to provide limited universal floating movement of the lower ends thereof which carry the respective pitting heads.

As previously stated, the respective control and mounting shafts 25 and 35, while having their own mounting for floating movement, are under the control of spring-urged means and latch means to control their movement between open and closed positions. With the respective shafts 25 and 35 spread apart as shown in Figure 7, for example, the jaws of the heads are open. The spring means for urging the shafts inwardly to their head closing position are best illustrated in Figures 3 and 22. As seen in Figure 22, the shaft 25 nests loosely within its sliding guide collar 61 to which are attached respective springs 76 and 77 disposed substantially at right angles to each other and extending between respective pins 78 and 79 secured to the frame of the machine and respective clips 81 secured as by welding to the sleeves 61. It will be noted that the spring 76 is in a lower plane than the spring 77. Similarly the shaft 35 and its sleeve 62 are under control of respective springs 82 and 83.

To restrain such inward movement of the shafts 25 and 35 except when such movement is desired, these shafts are under control of respective restraining levers 86 and 87 (Figure 23) respectively pivoted at 88 and 89 on a frame bar 91. At their free ends the levers 86 and 87 have respective V-shaped shoes 86a and 87a to engage the shafts 25 and 35, respectively. To hold the shafts 25 and 35 in their normal outward positions and to control release thereof to move under spring pressure to their inner positions, the arms 86 and 87 intermediate their ends are pivotally connected to respective links 92 and 93 of a toggle linkage pivotally connected at 94 to a control slide 96. Referring to Figures 3 and 21, the control slide 96 is made up of a lower piece 96a guided at one end in the end wall 14 and an upper piece 96b connected thereto by a block 97 in which a control pin 98, referred to hereinafter, is secured. At its left end the portion 96b of the control slide 96 are carries a vertically extending control pin 99, also referred to hereinafter.

Referring again to Figure 23, it will be noted that the respective pairs of toggle links 92 and 93 are broken upwardly with respect to their center so that the springs 76, 77, 82, and 83 acting through the shafts 25 and 35 and the arms 86 and 87 hold the toggle linkage 92—93 in the position as shown in Figure 23.

Release means are provided for the toggle control linkage of the pitting heads to enable the spring actuating means therefor to move them from their outer positions (pitting heads open) to their inner positions (pitting heads closed), and this control means is preferably responsive to the positioning of respective peach halves with reference to the respective pitting heads by the operator.

Referring to Figures 3, 4 and 23, there is associated with the pitting head comprising the jaws 21 and 22 a peach responsive trip element or pit locator 101 which has a knife edge 101a presented to the stem end of a pit when the peach is placed in aligned position with the pitting head. This trip element 101 is carried by a trip lever 102 pivoted at 103 on the adjacent wall 11 and urged clockwise by a spring 104. At its upper end the lever 102 (Figures 4 and 23) has a bent end 102a which is apertured to receive loosely a pivot pin 106 secured in a cross-arm 107. This cross-arm extends across the lower portion 96a of the control slide 96 and carries a central pin 108 engaged in a slot 109 of the slide 96. The other head 20 comprising the jaws 31 and 32 has a similar tripping arrangement including a tripping element 111 (Figures 4 and 23) on a lever 112 pivoted at 113 and having a spring 114 associated therewith. At the upper end the lever 112 is connected by a pin 116 with the other end of the arm 107. The respective ends of the arms 102 and 112 are also associated with respective adjustable stop screws 117 and 118 carried by respective blocks 119 secured on the side walls 11 and having suitable lock screws associated therewith. Access to the screws 117 may be had through suitable apertures in the end cover plate 14.

Preferably, the spacing of the tripping elements 101 and 111 and the amount of movement thereof by a peach half is such that rearward movement of either of the levers 102 or 112 by itself (by engagement therewith of a peach) is insufficient to move the control slide 96 as there is sufficient lost motion between the pin 108 of the connecting link 107 and the adjacent end of the slot 109. However, when both of the levers 102 and 112 are moved at the same time, either by respective peach halves on the respective pitting heads or by one peach half and manual control of the other, then the movement of the control slide 96 occurs and is sufficient to move the center pivot 94 (Figure 23) of the toggle linkage 92—93 past center, so that the spring urged shafts 25 and 35 are moved inwardly from the full-line position shown in Figure 23, to an intermediate position with the extreme shown in dotted lines, so that the pitting heads are closed and the peach pit or peach pits, as the case may be, are grasped by the respective jaws of the pitting heads (see Figure 8) so that the peach halves are held ready for the pitting operation.

The operating means for the pitting knives includes a drive train comprising a gear 131 (Figures 3 and 22) carried by an extended hub 132 that extends between and is journalled in the top plate 13 and the bottom wall of the frame piece 12. The gear 131 carries the operating handle 72. This gear 131 meshes with a gear 133 of equal size similarly carried by an extended hub 134. The extension of the hub 134 carries a cam segment 138 which has a pin 139, which, in the home position of the parts shown in Figure 22, engages one arm 141 of a bell crank pivoted at 142 and having a second arm 143 extending across in cooperative relation to the pin 99, and having an aperture end engaging over a guide rod 144 for a restoring spring 146 which is held normally in compressed position by the arm 143 as shown in Figure 22. This spring 146 and the cooperating parts is a restoring spring to move the shafts 25 and 35 as later described from their inner positions where they are spring held by the springs 76, 77, 82 and 83 to their outer positions where they will be again held by the slide 96 and the toggle control linkage 92—93 therefor.

Referring to Figure 23, if the peach halves are moved downwardly as shown in this view to engage the tripping elements 101 and 111, the slide 96 is moved so that the toggle 92—93 is broken. The cooperating parts, including the arms 86, 87 and the shafts 25 and 35, are moved from their full line positions to their dotted line positions, corresponding to the full line positions thereof shown in Figure 24. This also corresponds to the pit engaging positions of the respective sets of pitting jaws shown in Figure 8.

Figure 1:
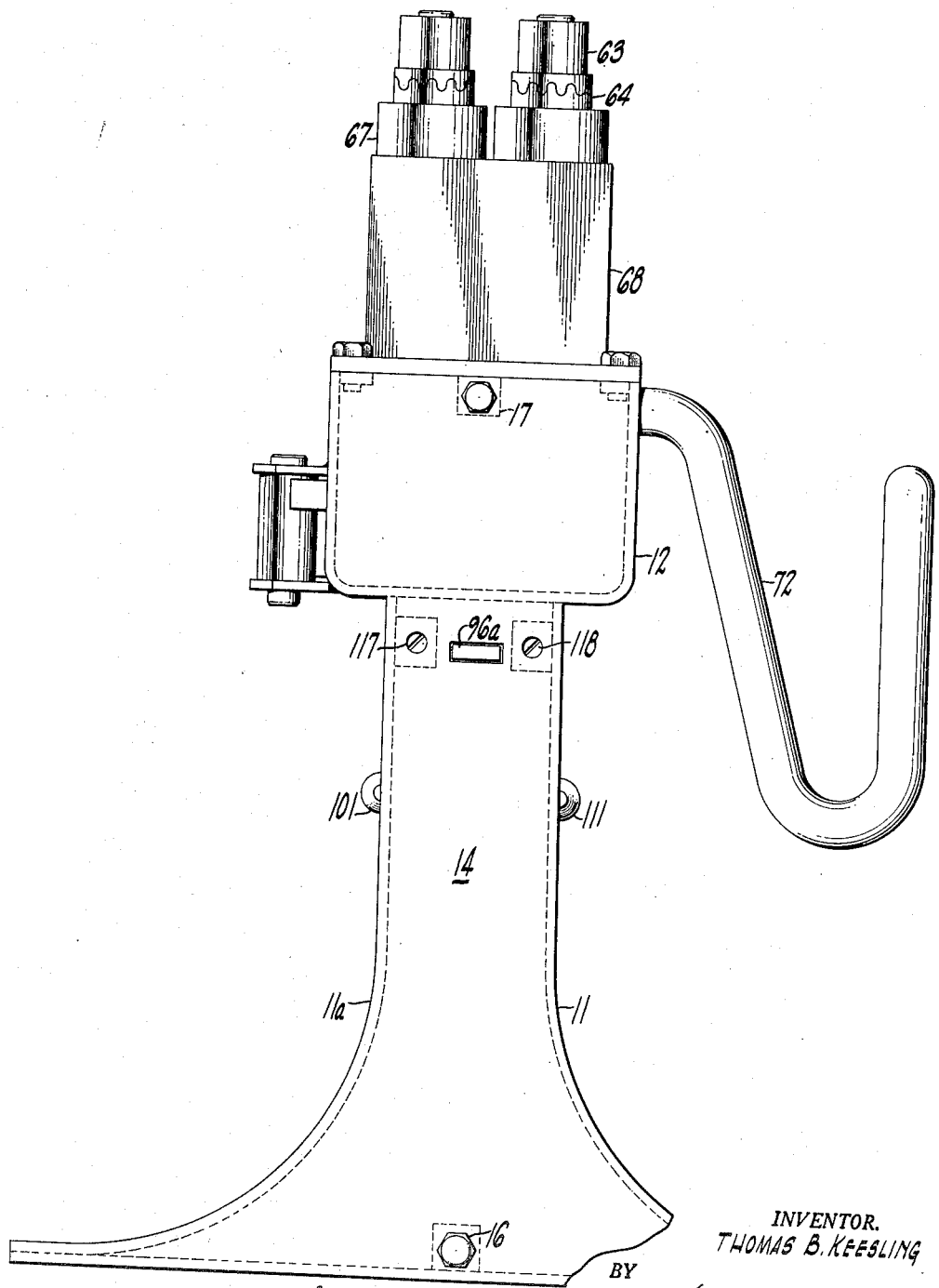
Figure 1 is an end elevational view of the peach pitter involving the invention.
Figure 8:
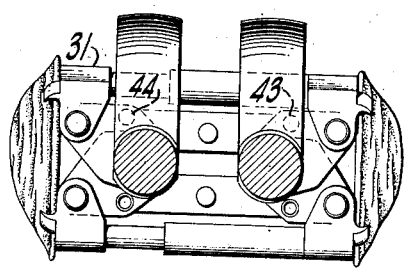
Figures 8, 9, 10, 11, 12, 13 and 14 are views taken similarly to Figure 7 but with the parts shown in different operating positions or conditions of the pitting heads.

With the parts conditioned as shown in Figures 8 and 24, that is, with the peach halves supported by their pits ready for pitting, the drive arm 72 is moved clockwise for approximately 90° from the position shown in Figure 24 to perform the pitting operation, that the gear 133 and the cam segment 138 follow counterclockwise, the pin 139 slowly releasing the bell crank 141—143 so that the spring 146 is active to move the slide 96 through the pin 99 upwardly until the upper trapezoidal end 98a of the pin 98 engages the outer surface of the cam 138 to restrain further such movement during the pitting operation. This outer cam surface 138a is seen most clearly in Figure 20. As the cam segment continues travelling until it moves beyond the end 98a of the pin 98, as seen in Figure 25, the spring 146 becomes effective to snap the toggle links 92, 93 and the control slide 96 to the position shown in Figure 25, where the center of a toggle linkage is just slightly beyond center but is not entirely at home position. This position is determined when the end 98a of the pin engages an inner surface 138b of the cam segment 138, and near the end of the travel of the operating handle 72. During this stroke of the handle 72, the peach pits are cut away from the flesh of the peach.

During the return movement of the handle 72 from the position shown in Figure 25, the pin 139 operates on the arm 141 of the bell crank to re-cock the spring 146 and toward the latter part of the travel of the cam segment in this direction a surface 138c thereof engages the end 98a of the pin 98 to move the control slide and the toggle links 92—93 from the positions shown in Figure 25 to that shown in Figure 22.

Figure 9:
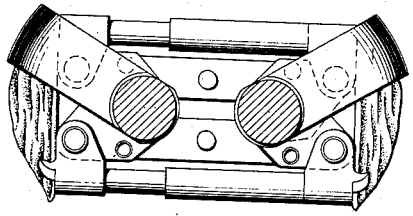

The operation of the pitting head and the flexibility of the operation is illustrated by the series of views comprising Figures 7 through 14. As previously explained, Figure 7 shows both of the heads 20 ready to receive peach halves while Figure 8 shows these heads after they have been tripped to engage the pits of the respective peach halves ready for the pitting operation. Figure 9 illustrates the positions of the parts of the respective pitting heads just after the pitting knives start their travel. In this connection, it will be noted that the position of the shafts 25 and 35 during movement of the jaws to their positions in engaging the pits, is placed in a controlled relation to the outer pit surface in accordance with the size of the pit so that a substantially uniform thickness of flesh will be left on the various sizes of pits.

Figure 10:
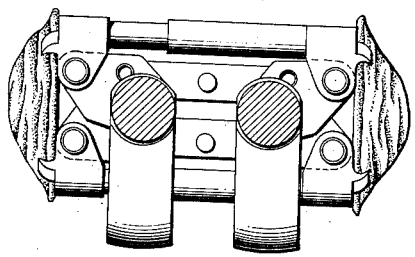
Figure 11:
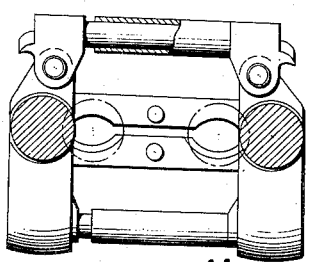

Figure 10 shows the position of the parts at the end of the pitting stroke of the knives while Figure 11 shows the jaws released at the end of the pitting stroke just prior to return of the knives to the home position shown in Figure 7.

Figure 12:
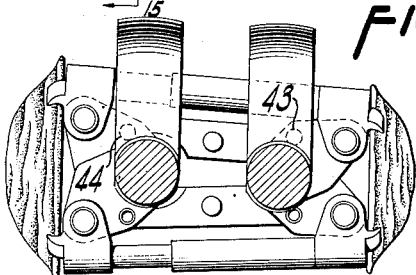
Figure 13:
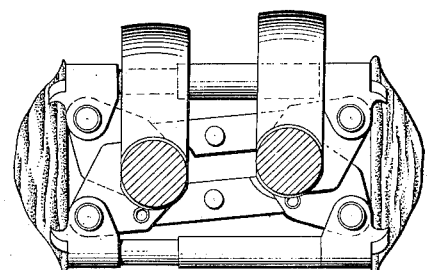

Figure 12 illustrates the flexibility of the connected pitting heads whereby one can grasp a large peach pit while the other is grasping a small peach pit, these being entirely independent of each other as far as their capacity is concerned with reference to the size of the pit. Such an operation might occur when the peach is split or sawed in half slightly off center so that one large half pit and one small one results. Figure 13 shows the flexibility of the pitting heads in being offset laterally due to different positioning of respective peach halves with respect to the pitting heads.

Figure 14:
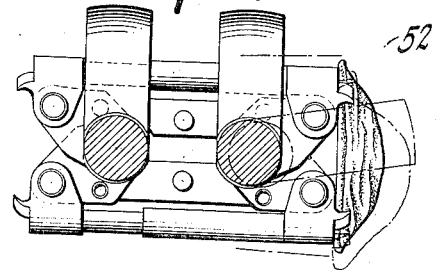

Figure 14 illustrates the flexibility of the machine in operating on only a single peach half in the pitting operation when the other peach half might have failed to have been secured by the pitting head, for example, because of the presence of a shattered pit or the like.

In the operation shown in Figure 14, also, if the pit half presented is extremely large, as shown in phantom lines so that the normal path of the knife would not clear the pit, the bevelled under surface 52a of the knife acts as a cam surface to cause the knife to ride up over the pit and displace the center of the shaft 35 outwardly. While this at the same time serves to open the jaws with respect to the peach pit, it will be noted that the knife driving against the peach pit will force it into one set of the jaws so that the peach half will remain secured until the pitting operation is completed.

To summarize briefly the operation of the pitting means disclosed herein, respective peach halves are presented to the respective pitting heads as shown in Figure 23 and are moved by the operator to engage the stem ends thereof with the tripping elements 101 and 111. This results in movement of the control slide 96 to break the toggle linkage 92—93 and allow the arms 86 and 87 to move inwardly under the spring pressure thereon and to move likewise the shafts 25 and 35. This results in movement or adjustment of the pitting heads and the pit gripping elements thereof from the position shown in Figure 7 to that shown in Figure 8, with the extent of movement determined by the size of the pit halves. In other words, the respective peach halves are supported by the pit portions thereof, and the knife holding and operating shafts 25 and 35 are adjusted in accordance with the respective sizes of the associated pit portions to enable the pitting knives to perform the desired cut.

Thereafter, the pitting knives are rotated through approximately 180° to perform the pitting operation, and the jaws of the respective pitting heads are restored to normal open position ready for presentation thereto of the next peach halves to be pitted.

While I have shown and described a preferred embodiment of the invention, it will be apparent that it is capable of variations and modifications within the scope of the claims appended hereto.

I claim:

1. A peach pitter comprising a support, a shaft mounted for universal floating movement, a pitting head carried by said shaft comprising opposed pit gripping means movable relative to each other and to said shaft to grasp a pit half therebetween, an abutment adjacent and between said pit gripping means for engaging the flat surface of a half pit, and a pitting knife carried by said shaft to swing in an arc around said gripping means to sever a peach half from the pit half held by said gripping means.

2. A peach pitter comprising a support, a shaft mounted for universal floating movement, a pitting head carried by said shaft comprising opposed pit gripping means movable relative to each other and to said shaft to grasp a pit half therebetween, an abutment adjacent and between said pit gripping means for engaging the flat surfaces of a half pit, means for controlling said pit gripping means for relative in and out translatory movement with respect to each other, and a pitting knife carried by said shaft to swing in an arc around said gripping means to sever a peach half from the pit half held by said gripping means.

3. A peach pitter comprising a support, a pair of pitting heads, each head including a pair of opposed pit gripping jaws and an abutment between said gripping jaws and adjacent to same for engaging the flat surface of the half pit, each pair of jaws having interconnecting means providing for relative in and out movement thereof, means for urging each pair of jaws inwardly with respect to each other to engage a pit portion, a pitting knife connected to each pair of jaws for controlled positioning with respect thereto and for pitting movement about said jaws with the pit held therein, and common drive means for said knives.

4. A peach pitter comprising a support, a pair of pitting heads, each head including a pair of opposed pit gripping jaws and an abutment between said gripping jaws and adjacent to same for engaging the flat surface of the half pit, each pair of jaws having a connecting toggle linkage, means for urging each pair of jaws inwardly with respect to each other to engage a pit portion, and knife means rotatably supported coaxially with the center pivot of each toggle linkage said knife means being of arcuate construction and having a path of movement encompassing the cooperating jaws and the pit portion held therebetween.

5. A peach pitter comprising a support, a pair of pitting heads, each head including a pair of opposed pit gripping jaws and an abutment between said gripping jaws and adjacent to same for engaging the flat surface of the half pit, each pair of jaws having a connecting toggle linkage, means for urging each pair of jaws inwardly with respect to each other to engage a pit portion, knife means rotatably supported coaxially with the center pivot of each toggle linkage, said knife means being of arcuate construction and having a path of movement encompassing the cooperating jaws and a pit portion held therebetween and a pair of parallel reaction links restrained against endwise movement and pivotally connected respectively to the arms of said toggle linkage intermediate the ends thereof.

6. A peach pitter comprising a support, a pair of pitting heads, each head including a pair of opposed pit gripping jaws, each pair of jaws having a connecting toggle linkage, and knife means rotatably supported coaxially with the center pivot of each toggle linkage, said knife means being of arcuate construction and having a path of movement encompassing the cooperating jaws and a pit portion held therebetween and a pair of parallel reaction links restrained against endwise movement and pivotally connected respectively to the arms of said toggle linkage intermediate the ends thereof and telescoping aligning connections between the respective aligned jaws of said heads.

7. A peach pitter comprising a support, opposed gripping means to engage the peripheral edge of the pit portion of a halved peach at spaced points, an abutment between and adjacent said gripping means for engaging the flat surface of the half pit portion, means for supporting said gripping means for relative movement to accommodate themselves to various size peach pits, means to operate said gripping means to engage a pit portion, an arcuate cutting member of a diameter to pass completely around said gripping means while the pit portion is held to sever the flesh, and journal means for said member on said supporting means.

8. A peach pitter comprising a support, opposed gripping means to engage the peripheral edge of the pit portion of a halved peach at spaced points, an abutment between and adjacent said gripping means for engaging the flat surface of the half pit portion, means for supporting said gripping means for relative movement to accommodate themselves to various size peach pits, means to operate said gripping means to engage a pit portion, an arcuate cutting member of a diameter to pass completely around said gripping means while the pit portion is held to sever the flesh, journal means for said member on said supporting means, and interconnecting means between said journal means and said supporting means to control automatically the position of said cutter member with respect to said pit portion.

9. The peach pitter of claim 8 in which the supporting means comprises a floating toggle linkage.

10. A peach pitter comprising a support, opposed gripping elements mounted for relative in and out movement on said support to engage the pit portion of a peach half adjacent the ends thereof, each gripping element having respective surfaces forming an acute angle for engaging the corner at the periphery of the peach pit half, means for controlling movement of said gripping means including means for yieldably urging them to pit engaging position, pitting means comprising an arcuate cutting element mounted for rotation about an axis disposed symmetrically with respect to said gripping elements and disposed intermediate the length of the peach pit engaged by said elements, and means for driving said pitting means to encompass said gripping elements and a pit portion held therein.

11. A peach pitter comprising a frame, a driving shaft having a floating mounting on said frame for rotation about an axis, an arcuate pitting knife carried by said shaft for rotation about said shaft axis, a pair of opposed pitting jaws disposed symmetrically with respect to said shaft axis for in and out movement in a direction transverse to said shaft axis, said jaws being disposed within the path of travel of said knife, an abutment between and adjacent said jaws for engaging the flat surface of a pit half, a toggle linkage connecting said jaws to each other and to said shaft, said shaft having a position between said jaws in the open position thereof with said toggle linkage extended and having a retracted position with said toggle linkage broken to enable movement of the gripping jaws inwardly to engage a half peach pit, and reaction link means pivotally contacted to each of said toggle linkage and having a connection at its other end to the frame.

12. A peach pitter comprising a support, peach half holding means including opposed gripping elements and an abutment between and adjacent said elements for engaging the flat surface of the half pit, said elements and said abutments being mounted on said support to engage a half pit at spaced points and to hold the half pit in position for pitting, pitting means positioned on said support relative to said gripping means for movement about said gripping elements and the pit portion held thereby to sever the flesh of the peach half from the pit portion, and means on said support for maintaining the gripping elements active to hold the pit portion during at least a portion of the severing operation.

13. A peach pitter comprising a support, a shaft journaled on said support, arcuate pitting knife means mounted on said shaft for rotation about the shaft axis, peach holding means comprising opposed pit gripping jaws and an abutment therebetween disposed intermediate the length of said knife means for holding the pit portion of a peach half, linkage means pivotally connected to said shaft intermediate the length of said knife means and to said jaws and supporting said jaws for relative in and out movement to engage and hold the pit portion, and means for operating said knife means to effect a cutting operation, with the path of travel of said knife means encompassing said gripping jaws.

14. A peach pitter comprising a support, means for holding the half pit of a peach half including opposed gripping elements for engaging the peripheral edge of the half pit at spaced points and an abutment between and adjacent said elements for engaging the flat surface of the half pit, pitting means movably mounted on said support relative to said gripping elements for movement thereabout to sever the flesh portion of a peach half from the half pit thereof, means for operating said gripping elements to move them to peach holding position, and means for operating said pitting means.

15. A peach pitter comprising a support, a plurality of relatively movable elements to engage the surface of the half pit of a peach half at spaced points to hold the peach half in position for pitting, abutment means adjacent to said elements and between the same for engaging the flat surface of the half pit, and knife means mounted for movement about said gripping element while in gripping position for severing the flesh portion of the peach half from the half pit.

16. A peach pitter as recited in claim 15 in which said gripping elements comprise opposed jaws having respective spaced apart pairs of pit gripping fingers.

17. A peach pitter as recited in claim 15 in which said gripping elements comprise opposed jaws having respective spaced apart pairs of pit gripping fingers and said abutment means respective surfaces adjacent and disposed at an angle with respect to said fingers.

18. A peach pitter comprising a support, a shaft on said support having a pitting knife thereon, a pair of opposed pit engaging jaws for grasping the half pit of a peach half at spaced points, abutment means adjacent and between said jaws for engaging the flat surface of a half pit, means to move the jaws to grip the half pit between the jaws and the abutment means and inter-connecting means between said shaft and said jaws responsive to the position of said jaws to control the position of the knife with respect to the half pit, and means for effecting operation of said pitting knife to pass about said jaws and the half pit while held therein to effect the pitting operation.

19. In a peach pitter as recited in claim 18 in which means is provided yieldly urging the jaws from an open position to a closed pit engaging position.

20. A peach pitter as recited in claim 18 in which said interconnecting means is a linkage between the jaws and the shaft.

21. A peach pitter as recited in claim 18 in which the interconnecting means includes a linkage between the jaws of the shaft, and said linkage includes peach half aligning surfaces disposed between the jaws and presented in the open position of the jaws.

22. A peach pitter as recited in claim 18 in which said linkage means is of toggle construction and is pivotally connected to said shaft at its center pivot.

23. A peach pitter as recited in claim 18 in which said linkage means is of toggle construction and is pivotally connected to said shaft at its center pivot, and reaction means connected to said linkage means for providing relative float of said jaws with reference to a half pit.

24. In a peach pitter, a support, a plurality of relatively movable elements to engage the surface of the half pit at spaced points, abutments adjacent said elements and between the same for engaging the flat surface of the half pit, means to move the elements to grip the half pit between the elements and abutments and support the half fruit free from any peach flesh support, and a knife movable about the elements while in gripping position.

25. In a peach pitter, a support, apertured abutment means disposed in a plane and for engagement of one side thereof by the flat surface of a half peach to establish a position of the peach, opposed pit engaging elements mounted on the other side of said abutment means for projection to engage the surface of the half pit at spaced points, a shaft movably mounted on said support on the other side of said abutment means for shifting of the axis thereof, a knife carried by said shaft, means to move said elements to engage the half pit and position the half peach on said abutment means, a controlling connection from said elements to said shaft to position said shaft simultaneously with the engagement of the half pit by said elements and to thereby determine the point of entry of said knife into the flesh of the peach and the point of exit of said knife from the flesh of the peach, means for operating said knife, and means forming an internal line of shear for said knife adjacent the point of exit.

26. In a peach pitter, a support, apertured abutment means disposed in a plane and for engagement of one side thereof by the flat surface of a half peach to establish a position of the peach, opposed pit engaging elements mounted on the other side of said abutment means for projection to engage the surface of the half pit at spaced points, a shaft movably mounted on said support on the other side of said abutment means for shifting of the axis thereof, a knife carried by said shaft, means to move said elements to engage the half pit and position the half peach on said abutment means, a controlling connection from said elements to said shaft to position said shaft simultaneously with the engagement of the half pit by said elements and to thereby determine the point of entry of said knife into the flesh of the peach and the point of exit of said knife from the flesh of the peach, means for operating said knife, means forming a line of shear for said knife adjacent the point of exit, and means for maintaining the relative position of said elements and said shaft during initial driving of said knife.

27. A peach pitter comprising a support, a shaft mounted for universal floating movement on said support, a pitting head carried by said shaft comprising opposed pit gripping jaws for engaging the peripheral edge of the pit portion of a halved peach, an abutment between and adjacent the gripping jaws for engaging the flat surface of the half pit, a toggle linkage connecting said jaws and pivotally connected at its center to said shaft, a pitting knife carried by said shaft for rotation about the shaft axis and for cutting movement about said pitting jaws and a pit portion held therein, and resilient means relatively urging said shaft and said jaws to effect closing movement of said jaws to engage a pit.

28. A peach pitter comprising a support, a shaft mounted for universal floating movement on said support, a pitting head carried by said shaft comprising opposed pit gripping jaws for engaging the peripheral edge of the pit portion of a halved peach, an abutment between and adjacent the gripping jaws for engaging the flat surface of the half pit, a toggle linkage connecting said jaws and pivotally connected at its center to said shaft, a pitting knife carried by said shaft for rotation about the shaft axis and for cutting movement about said pitting jaws and a pit portion held therein, normally restrained resilient means relatively urging said shaft and said jaws to effect closing movement of said jaws to engage a pit, and means responsive to positioning of a peach half into operative relation with the pitting head for releasing the restraint of said resilient means.

THOMAS B. KEESLING.

References Cited in the file of this patent

UNITED STATES PATENTS

| Number | Name | Date |
|---|---|---|
| 1,512,410 | Eldridge | Oct. 21, 1924 |
| 1,726,685 | Tottenham et al. | Sept. 3, 1929 |
| 2,255,533 | Ridley | Sept. 9, 1941 |
| 2,402,181 | Polk, Sr., et al. | June 18, 1946 |
| 2,551,076 | Waters | May 1, 1951 |

FOREIGN PATENTS

| Number | Country | Date |
|---|---|---|
| 109,534 | Australia | Jan. 25, 1940 |